(12) United States Patent
Lester et al.

(10) Patent No.: US 11,237,893 B2
(45) Date of Patent: Feb. 1, 2022

(54) USE OF ERROR CORRECTION-BASED METRIC FOR IDENTIFYING POORLY PERFORMING DATA STORAGE DEVICES

(71) Applicant: Western Digital Technologies, Inc., San Jose, CA (US)

(72) Inventors: Robert Lester, Colorado Springs, CO (US); Austin Striegel, Rochester, MN (US); Jared Tesone, Poughkeepsie, NY (US); Timothy Lieber, Colorado Springs, CO (US); Evan Richardson, Rochester, MN (US); Donald Penza, Rochester, MN (US)

(73) Assignee: Western Digital Technologies, Inc., San Jose, CA (US)

( * ) Notice: Subject to any disclaimer, the term of this patent is extended or adjusted under 35 U.S.C. 154(b) by 87 days.

(21) Appl. No.: 16/688,992

(22) Filed: Nov. 19, 2019

(65) Prior Publication Data

US 2020/0409779 A1 Dec. 31, 2020

Related U.S. Application Data

(63) Continuation-in-part of application No. 16/453,368, filed on Jun. 26, 2019, now Pat. No. 10,969,969.

(51) Int. Cl.
*G06F 11/00* (2006.01)
*G06F 11/07* (2006.01)
(Continued)

(52) U.S. Cl.
CPC .......... *G06F 11/076* (2013.01); *G06F 3/0619* (2013.01); *G06F 3/0652* (2013.01);
(Continued)

(58) Field of Classification Search
CPC ..... G06F 11/00; G06F 11/076; G06F 11/0709
See application file for complete search history.

(56) References Cited

U.S. PATENT DOCUMENTS

| 5,450,609 A | 9/1995 | Schultz et al. |
| 6,192,499 B1 | 2/2001 | Yang |
| (Continued) | | |

FOREIGN PATENT DOCUMENTS

| CN | 101324859 A | 12/2008 |
| CN | 104714869 B | 3/2015 |
| (Continued) | | |

OTHER PUBLICATIONS

HDD Regenerator for Windows: review, submitted on Mar. 21, 2018, 2 pages, downloaded from https://howtorecover.me/hdd-regenerator-windows-review-download.
(Continued)

*Primary Examiner* — David E Martinez
(74) *Attorney, Agent, or Firm* — John D. Henkhaus

(57) ABSTRACT

An approach to identifying poorly performing data storage devices (DSDs) in a data storage system, such as hard disk drives (HDDs) and/or solid-state drives (SSDs), involves retrieving and evaluating a respective set of log pages, such as SCSI Log Sense counters, from each of multiple DSDs. Based on each respective set of log pages, a value for a Quality of Service (QoS) metric is determined for each respective DSD, where each QoS value represents an average percentage of bytes processed without the respective DSD performing an autonomous error correction. In response to a particular DSD reaching a predetermined threshold QoS value, an in-situ repair may be determined for the particular DSD or the particular DSD may be added to a list of candidate DSDs for further examination, which may include an FRPH examination for suitably configured DSDs.

20 Claims, 7 Drawing Sheets

(51) Int. Cl.
  *G06F 11/10*  (2006.01)
  *G06F 11/14*  (2006.01)
  *G06F 3/06*   (2006.01)
  *G06F 11/30*  (2006.01)
  *G06F 11/20*  (2006.01)

(52) U.S. Cl.
  CPC .......... *G06F 3/0653* (2013.01); *G06F 3/0658* (2013.01); *G06F 3/0689* (2013.01); *G06F 11/0772* (2013.01); *G06F 11/0793* (2013.01); *G06F 11/1076* (2013.01); *G06F 11/1471* (2013.01); *G06F 11/2053* (2013.01); *G06F 11/3034* (2013.01)

(56) References Cited

U.S. PATENT DOCUMENTS

| | | | |
|---|---|---|---|
| 6,263,454 | B1 | 7/2001 | Gold et al. |
| 6,408,406 | B1 * | 6/2002 | Parris .................. G11B 20/182 714/41 |
| 7,743,284 | B1 | 6/2010 | Taylor et al. |
| 7,765,437 | B2 | 7/2010 | Gittins et al. |
| 8,085,488 | B2 | 12/2011 | Feliss et al. |
| 8,473,779 | B2 | 6/2013 | Siewert et al. |
| 9,262,429 | B2 | 2/2016 | Roomp et al. |
| 9,448,905 | B2 | 9/2016 | Kang et al. |
| 9,684,560 | B2 | 6/2017 | Thatcher et al. |
| 9,710,317 | B2 | 7/2017 | Gupta et al. |
| 9,729,534 | B2 | 8/2017 | Zhang et al. |
| 2002/0036850 | A1 | 3/2002 | Lenny et al. |
| 2005/0091369 | A1 | 4/2005 | Jones |
| 2006/0253767 | A1 | 11/2006 | Winarski et al. |
| 2010/0275057 | A1 | 10/2010 | Durica et al. |
| 2012/0260138 | A1 | 10/2012 | Downing, III et al. |
| 2014/0136915 | A1 | 5/2014 | Hyde et al. |
| 2016/0224412 | A1 * | 8/2016 | Healy ................ G06F 11/0793 |

FOREIGN PATENT DOCUMENTS

| | | |
|---|---|---|
| CN | 105893231 A | 5/2016 |
| JP | 2004342168 A | 12/2004 |

OTHER PUBLICATIONS

Paris et al., Self-Repairing Disk Arrays, 6 pages, Cornell University, arXiv.org, downloaded from https://arxiv.org/ftp/arxiv/papers/1501/1501.00513.pdf.

Botezatu et al., Predicting Disk Replacement towards Reliable Data Centers, KDD '16, Aug. 13-17, 2016, 10 pages, San Francisco, CA, USA, downloaded from https://www.kdd.org/kdd2016/papers/files/adf0849-botezatuA.pdf.

Mashhadi et al., Moving towards Real-time Data-driven Quality Monitoring: A Case Study of Hard Disk Drives, ScienceDirect, 46th SME North American Manufacturing Research Conference, NAMRC 46, 2018, pp. 1107-1115, Texas, USA, downloaded from https://www.sciencedirect.com/science/article/pii/S2351978918308230.

International Search Report and Written Opinion for counterpart PCT/US2019/068624, dated Apr. 6, 2020, 13 pages, ILPO ISA/IL.

* cited by examiner

USE OF ERROR CORRECTION-BASED METRIC FOR IDENTIFYING POORLY PERFORMING DATA STORAGE DEVICES

CROSS-REFERENCE TO RELATED APPLICATIONS

This application is a continuation-in-part of and claims the benefit of priority to U.S. patent application Ser. No. 16/453,368 filed on Jun. 26, 2019, now U.S. Pat. No. 10,969,969, entitled "Use Of Recovery Behavior For Prognosticating And In-Situ Repair of Data Storage Devices", the entire content of which is incorporated by reference for all purposes as if fully set forth herein.

FIELD OF EMBODIMENTS

Embodiments of the invention may relate generally to data storage systems and, more particularly, to approaches to identifying operationally problematic data storage devices.

BACKGROUND

There is a commercial demand for high-capacity digital data storage systems, in which multiple data storage devices (DSDs) (or, generally, "drives") are housed in a common enclosure. Data storage systems often include large enclosures that house multiple shelves on which rows of DSDs are mounted. A typical approach with data storage systems is to decommission, or stop using, DSDs that misbehave or fail in the field. Such DSDs are then often swapped for replacement DSDs by technicians at the internal lab or customer deployment site. Failed drives are typically either destroyed by the customer or returned to the manufacturer for failure analysis.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Approaches to identifying problematic in-use data storage devices are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of an Illustrative Operating Context

Data Storage System

Figure 2:
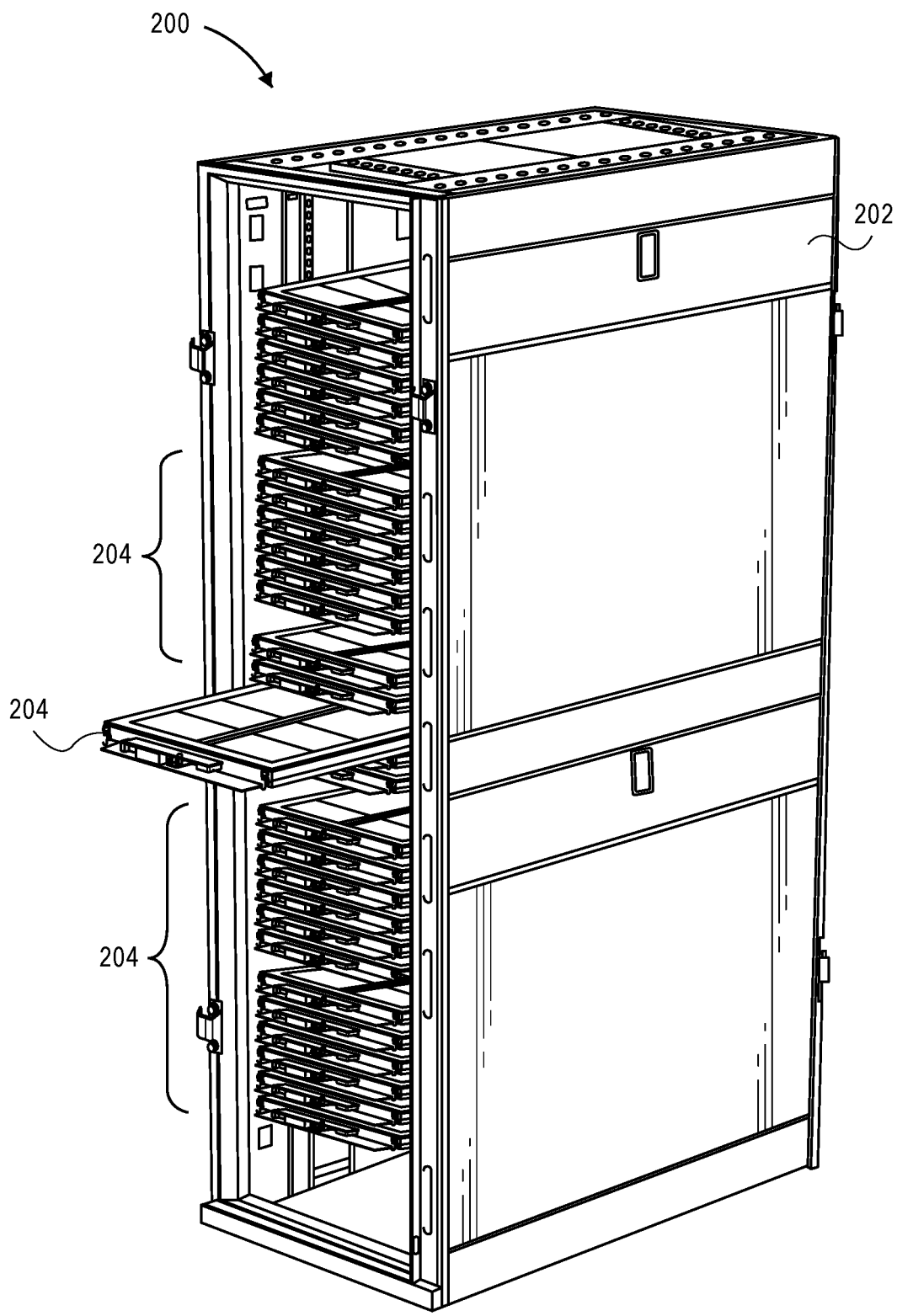
FIG. 2 is a perspective view illustrating a data storage system, according to an embodiment.

There is a commercial demand for high-capacity digital data storage systems, in which multiple data storage devices (DSDs), such as hard disk drives (HDDs) and/or solid-state drives (SSDs) are housed in a common enclosure. Data storage systems often include large enclosures that house multiple shelves on which rows of DSDs are mounted. FIG. 2 is a perspective view illustrating an example data storage system, according to embodiments. A data storage system 200 may comprise a system enclosure 202 (or "rack 202"), in which multiple data storage system trays 204 are housed. Each tray 204 may be placed or slid into a corresponding slot within the rack 202, for example. Rack 202 further houses a system controller, and may further house switches, storage server(s), application server(s), a power supply, cooling fans, etc.

Figure 3:
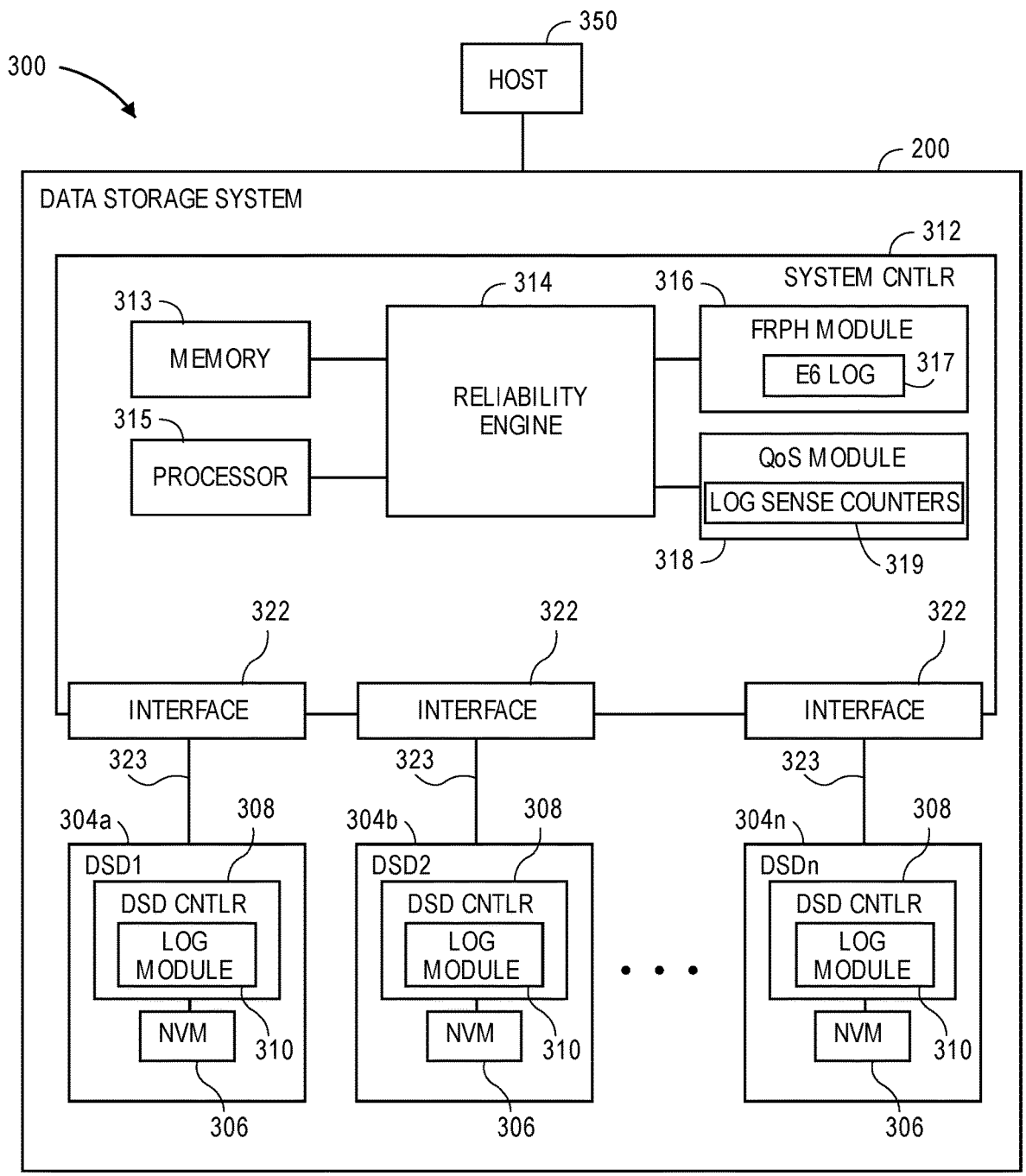
FIG. 3 is a block diagram illustrating a data storage system architecture, according to an embodiment.

FIG. 3 is a block diagram illustrating a data storage system architecture, according to an embodiment. Example architecture 300 illustrates a data storage system 200 that comprises multiple hard disk drives (HDDs) 304a (HDD1), 304b (HDD2), and 304n (HDDn), where n represents an arbitrary number of HDDs (and/or SSDs) that may vary from implementation to implementation. Each HDD 304a-304n is communicative with and under the control of a data storage system controller 312, via a communication interface 322 according to a corresponding communication protocol 323. Each HDD 304a-304n includes corresponding non-volatile memory (NVM) 306 (e.g., typically in the form of spinning magnetic disk media in the case of HDDs) controlled by a respective HDD controller 308, which includes a log module 310. Each log module 310 (which may be, for example, constituent to a corresponding system on chip (SoC), such as part of the data channel circuitry or the hard disk controller circuitry, as depicted, in the context of an HDD) is capable of logging actions taken by the HDD controller 308, such as logging of read, write, and seek errors, associated recovery actions, and other near-term and long-term HDD status information. The system controller 312 of data storage system 200 includes memory 313, a processor 315, and a reliability engine 314 and an associated FRPH (Full Recoveries Per Hour) module 316, which collectively represent procedural functionality involving prognosticating of and in-situ repair of the HDDs 304a-304n, as described in more detail elsewhere herein.

Processing, functions, procedures, actions, method steps, and the like, that are described herein as being performed or performable by system controller 312, or by a HDD 304a-304n, may include enactment by execution of one or more sequences of instructions stored in one or more memory units and which, when executed by one or more processors, cause such performance. System controller 312 may be embodied in any form of and/or combination of software, hardware, and firmware. For example, and according to an embodiment, the system controller 312 comprises an application-specific integrated circuit (ASIC) comprising at least one memory unit for storing such instructions (such as firmware, for a non-limiting example) and at least one processor for executing such instructions, enabling prognosticating regarding potentially problematic HDDs (e.g., "silent" failing drives, which might be struggling internally to complete data transactions but have not yet failed publicly) of the plurality of HDDs 304a-304n, and managing, controlling, facilitating in-situ repair actions corresponding to failed and failing HDDs.

The data storage system 200 may be communicatively coupled with a host 350, which may be embodied in a hardware machine on which executable code executes (for non-limiting examples, a computer or hardware server, and the like), or as software instructions executable by one or more processors (for non-limiting examples, a software server such as a database server, application server, media server, and the like). Host 350 generally represents a client of the data storage system 200, and has the capability to make read and write requests (input/output or "IO") to the data storage system 200. Note that the system controller 312 may also be referred to as a "host" because the term is often generally used in reference to any device that makes IO calls to a data storage device or an array of devices, such as HDDs 304a-304n.

Introduction

If used herein, the term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees.

While terms such as "optimal", "optimize", "minimal", "minimize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Some data storage systems implement diagnostic and in-situ (e.g., "in place" or "in position") repair procedures. This means that system HDDs that have failed during operation in the field are diagnosed and fixed in the field to the extent possible, and if they cannot be fixed they are retired in place rather than replaced. Preferably, in-situ repairs entail automated or semi-automated procedures, while the HDD of interest remains in the system enclosure. Many HDD repairs do not result in any loss of capacity or performance. An HDD may be repaired in a way that still allows continued use by system software, albeit with reduced capacity or performance. An HDD that cannot be repaired may be allowed to fail in place within the system, such as in scenarios in which the system was shipped with over-provisioned storage capacity that permits availability of the full, specified storage capacity despite a number of drive failures. In-situ repair can eliminate the cost of scheduling service technicians to replace drives that fail in the field, as well as the cost of those replacement drives. Additionally, in-situ repair can reduce the AFR (annual failure rate) of storage devices, and will likely eliminate the ARR (annual return rate) as future product releases adopt a "fail-in-place" model.

Implementations of in-situ repair in HDDs can minimize the amount of over-provisioning necessary in a data storage system to be able to offer a lifetime hardware warranty. As mentioned, some storage systems (and/or storage system operating system software) may be able to continue using many HDDs after they fail. Analysis of failed drives shows that many HDDs that fail in the field can be restored to full or partial usage with relatively uncomplicated techniques.

A fairly common manifestation of poor data storage device (DSD) performance causes data storage systems to exhibit poor performance. Existing approaches to identifying the at-fault devices is significantly resource-intensive. Data storage systems encounter a population of HDDs that exhibit excessive average IO completion time (latency). This can occur with respect to read operations or write operations, or both. This behavior occurs because the drive is invoking high utilization of Data Recovery Procedure (DRP) actions every time a faulty, marginal, or error-prone head or surface is accessed. This population of devices is referred to herein as "poorly performing drives".

Poorly performing drives typically function well enough that they do not yield host-visible hard errors (e.g. Check Condition+KCQ (Key Code Qualifier)), nor do the IO completion latencies exceed the HBA (Host Bus Adaptor) timeout threshold (~5-10 seconds). However, these drives typically exhibit much higher average latency than their peer drives, enough to cause major problems. In a system that uses Erasure Coding and/or RAID technologies, several affiliated drives must each perform one or more IO requests to satisfy the needs of a single higher-level operation (e.g., S3 operation). Additionally, some external host operation types cannot complete until all member drives have successfully completed their assigned roles in the operation. Hence, a drive that is slow to complete some or most IO requests can increase the completion time of the external host operation. Poorly performing drives can also lead to resource bottlenecks or even starvation when the data storage system attempts to autonomously perform administrative operations like object verify or rebuild.

Currently, poorly performing drives cannot be precisely detected by the data storage system's hosts. This is often because the drive health detection methodology is based on detection of host-visible hard errors or command protocol timeouts. Poorly performing drives are therefore very hard to identify, and the associated service tickets usually require manual intervention on the target machine.

Avoiding Excessive Tail Latency

The storage industry generally defines a poorly performing drive as one that exhibits high "tail latency". Tail latency refers to a phenomenon in which most IOs complete within a reasonable time, but a very small percentage complete with an unacceptably high latency. A typical OEM customer's specification for drive tail latency might read something to the effect of "with a maximum command queue depth of 16, at most only 1:100 k single block random reads is permitted to exceed a 1000 millisecond (msec) completion time".

Typically, high tail latency occurs because of intentional drive behaviors, as follows:

(a) Prioritization of IO requests against seek distance from the current head position. HDDs generally optimize command execution in a way that minimizes seek and rotational latency. Such a strategy can defer fulfillment of IO requests that are inconvenient. Only once an IO request has aged beyond a fixed maximal completion time (perhaps 2-3 seconds) is it then elevated to high priority so it can be completed quickly to avoid the host from timing out.

(b) Prioritization of IO requests against drive background activities. DSDs generally prioritize host IO over background activities. However, if host load requests arrive at critical times, or if the request stream is sufficiently persistent over a long period of time, eventually some or all host IO requests will be deferred until at least some background activities have been allowed to run.

One approach to avoiding high tail latency may involve minimization of queue depth. If an HDD is given only a small number of IOs to process concurrently (at the extreme only 1), the drive won't have an opportunity to choose a preferred seek pattern. This leads to a more deterministic latency, at the expense of lower throughput. A recently proposed approach to mitigating the effects of tail latency is to allow hosts to specify a specific maximum timeout for each command they issue to a drive. If the drive cannot complete the operation in the allotted time, the drive will "fail fast", which signals the host to rebuild the data from redundant sources.

Host Monitoring of Average Latency

Another industry approach involves monitoring disks with an external tool like the Linux built-in "iostat" tool, which reports the average IO latency of transactions to each DSD, updated over arbitrary time windows. However, the reported latencies include all portions of the backend stack, e.g., the latency being measured is starting from the Linux driver, to the HBA driver, to the HBA, to the DSD, back from the DSD, back through the HBA and its driver, and ultimately back to the Linux driver. It is possible for the latency of operations external to the DSD to be comparable to or larger than the latency of the DSD itself. This makes it difficult or impossible to isolate the exact latency which is attributable to a poorly performing DSD. Statistics based on "iostat" also fail to distinguish the various causes of drive-induced latency such as internal error corrections, background tasks or congestion presented by a heavy IO load pattern.

Host Monitoring of Smart

Another approach is to rely on SMART (Self-Monitoring, Analysis and Reporting Technology), an onboard self-diagnostic subsystem. As a technology, SMART is capable of alerting hosts to performance degradation of a DSD. However, existing real-world implementations of SMART are limited to offering a means of gathering a consolidated report of health-related statistics using a single shell command sequence. In practice, SMART has very limited ability to predict or diagnose a faulty drive, especially a poorly performing one that does not exhibit hard errors.

Reliability Engine

With reference to FIG. 3, according to an embodiment, a software component referred to as the reliability engine 314 is responsible for performing or managing data storage device (DSD) diagnostic, prognostication, and repair operations. With respect to diagnosis, when the system (e.g., system controller 312 of data storage system 200) detects a problem with a DSD 304a-304n of the data storage system 200, the system invokes the reliability engine 314 and passes information that describes what issue the system had with that DSD. Typically, the reliability engine 314 may enter a diagnostic state with respect to that DSD and analyze the DSD to identify the root cause of the issue. With respect to repair, once the root cause of the issue has been identified, reliability engine 314 notifies system controller 312 logic of the recommended repair action, which the system controller 312 can schedule according to the level of urgency based on system events (e.g., code upload, impending shutdown/reboot) and the level of disk redundancy within the system. Once the system controller 312 requests a repair, the DSD is typically taken offline and the reliability engine 314 conducts the repair (which may take anywhere from a few seconds to a few days). At the conclusion of the repair and post-repair diagnostics, the DSD may either be restored to full use, restored to use with reduced capacity and/or performance, or the DSD may be retired from the system.

According to embodiments, with respect to prognosticating, the reliability engine 314 also periodically monitors the health of each DSD while it is online and being used by the system. In the context of hard disk drives (HDDs), this may be done by reading and analyzing a time-limited subset of the HDD's internal E6 log(s) 317, such as in conjunction with or with assistance from the FRPH module 316, as described in more detail elsewhere herein. Similarly, further in the context of solid-state drives (SSDs), this may be done by reading and analyzing the DSD's Log Sense Counters 319, such as in conjunction with or with assistance from the QoS (Quality of Service) module 318 as described in more detail elsewhere herein. Thus, reliability engine 314 can proactively detect, for example, a latency issue or an error rate issue in a DSD that may (or may not) be impacting the host visible performance, but is not serious enough for the system to fail the DSD. For example, an HDD that consistently enters high DRP (Data Recovery Procedure) levels when accessing a specific head or region of media will often exhibit higher IO completion latency than its peers. In some storage systems' erasure coded or RAID-based system, host visible latency is often bounded by the performance of the slowest DSD in the data set. The reliability engine 314 can asynchronously notify system controller 312 logic of a recommended repair operation for that DSD. Once the system allows reliability engine 314 to proceed with a repair, e.g., to remove the high latency head/surface of an HDD, the host visible latency degradation is resolved.

Hard Disk Drive Prognostication Tool: Full Recoveries Per Hour

Figure 4:
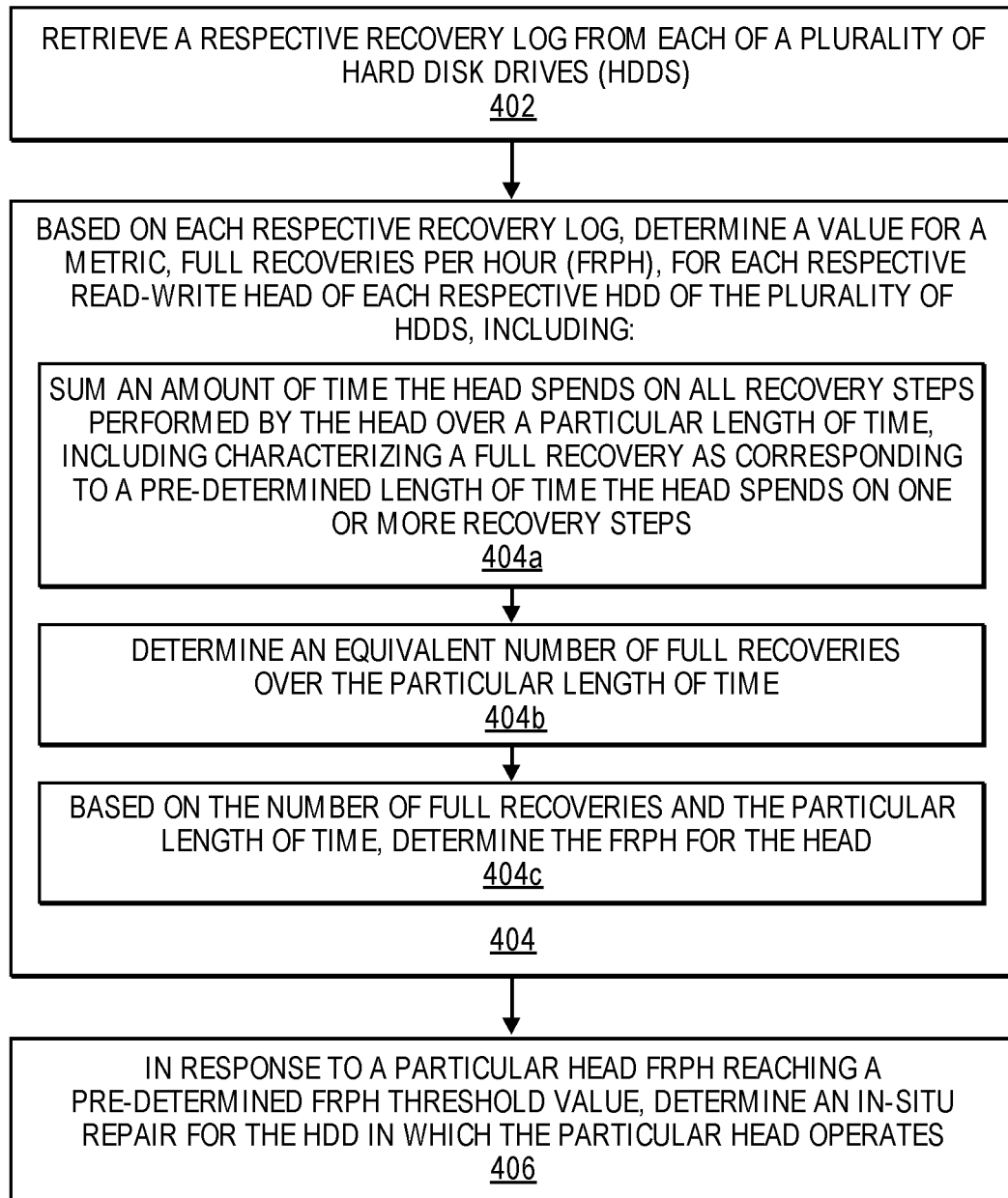
FIG. 4 is a flow diagram illustrating a method of identifying problematic hard disk drives, according to an embodiment.

FIG. 4 is a flow diagram illustrating a method of identifying problematic hard disk drives, according to an embodiment. The process or procedure of FIG. 4 may be implemented for execution as one or more sequences of instructions stored in one or more memory units and which, when executed by one or more processors, cause performance of the process. For example, the sequences of instructions (e.g., reliability engine 314 embodied in firmware of system controller 312 of FIG. 3) stored in one or more memory units (e.g., ROM inherent to controller firmware) and which, when executed by one or more processors (e.g., processor 315 of system controller 312 of FIG. 3), may cause performance of the process illustrated in FIG. 4.

Furthermore, a comparable method of identifying problematic solid-state drives (SSDs), modified appropriately in view of the different technologies underlying a hard disk drive and a solid-state drive, is contemplated. For example, with an HDD, a main reason that DRP steps add host-visible latency is because of the rotational latency of having to wait for additional revolutions of the media, to retry the operation. By contrast, there is no rotational latency in the context of an SSD, thus, a key contributor to host-visible latency are scenarios in which host IO has to wait for other activities the SSD is performing, such as host IO requests colliding with background tasks (e.g., garbage collection, cell refresh, read disturb, etc.), host IO requests colliding with other host IO requests, and increased latency caused by non-volatile memory components that take longer to program/erase operations because they are exhibiting degradation due to age and/or wear. Hence, a functionally equivalent metric to FRPH, but for SSDs, can be used to quantify the variability of latency (and, likewise, variability of QoS (Quality of Service)) in storage system SSDs.

At block 402, a respective recovery log is retrieved from each of a plurality of hard disk drives. For example, an E6 log 317 (FIG. 3) is retrieved by system controller 312 (FIG. 3) of data storage system 200 (FIGS. 2, 3) from the log module 310 (FIG. 3) of one or more of the plurality of HDDs 304a-304n (FIG. 3). An E6 log 317 refers to an implementation of a binary file used to snapshot the state of an HDD. An E6 log 317 contains a large number (tens) of subsections, including a Media Error Log, and is typically in the size range (order of magnitude) of 10 MB to 100 MB, depending on which "modes" (groups of sections) are fetched. There is also an incremental E6 log capability, which only fetches state that is "new", i.e., since the most recent full or incremental fetch. Incremental E6 logs may be as small as a few MB but could be up to the size of a full E6 log 317. The sections of an E6 log 317 have various themes/purposes, some are global fixed size "life of the drive" state, and some grow over time as more drive activities accumulate. Some of the section's data elements are retained for the life of the drive, and some wrap, with the HDD autonomously deleting older state to avoid exceeding a size boundary ceiling. According to an embodiment, the Media Error Log portion of the E6 log 317 is used hereafter in this method to compute the following FRPH (Full Recoveries Per Hour) metric, and is referred to herein functionally as a "recovery log" because this particular portion or section of the E6 log 317 records the data recovery steps (e.g., seek recovery, read recovery, write recovery) performed by each read-write head within a corresponding HDD.

At block 404, based on each respective recovery log, a value for the metric referred to as FRPH is determined for each respective read-write head of each respective HDD of the plurality of HDDs. For example, the FRPH value is computed as described hereafter for each read-write head (e.g., read-write head 110a of FIG. 1) of each of the one or more plurality of HDDs 304a-304n, based on the recovery logs retrieved at block 402. A DRP or recovery "step" is an action that the HDD dynamically invokes to recover data from a sector or sectors that was not readable following the execution of prior steps. For example, there may be hundreds of possible DRP steps available to a HDD/head, which may be more generally classified in one of a category for read, write, and seek recovery steps, where higher step numbers represent more involved recovery algorithms and therefore take longer to execute than lower numbered DRP steps. According to an embodiment, a "full recovery" is execution of all possible DRP steps. If a full recovery is not successful the host receives a hard error indicating that the data could not be transferred.

At block 404a, the amount of time the head spends on all recovery steps performed by the head are summed over a particular length of time, i.e., the evaluation period. For example, the relevant recovery log is parsed and the severity (time spent per each "type" or "level" of recovery step) of all the recovery steps performed by each HDD head (e.g., from the HDD Media Error Log section of the E6 log 317) are summed, for a non-limiting example, over the last 300 hours of operating time. According to an embodiment, the evaluation period is a configurable parameter allowing for an arbitrary time window over which to analyze the recovery steps.

Conceptually, a full recovery means all the recovery steps for a recovery event have been run, with the more recovery steps needed indicating a relatively more severe issue and the more time the data recovery would take. However, according to an embodiment, for algorithmic purposes a "full recovery" is characterized as corresponding to a predetermined length of time the head spends on one or more recovery steps. According to an embodiment, one full recovery is established as approximately 2.5 seconds of real time being spent by a head on one or more recovery steps. However, how a full recovery is characterized for algorithmic purposes may vary from implementation to implementation. Hence, for every predetermined amount of time (e.g., 2.5 seconds of real time) the head spends on recovery steps a "full recovery" is counted. Regarding the severity of recovery steps, as discussed in reference to an exemplary system, there are hundreds of possible DRP recovery steps, with higher step numbers representing more involved, complex recovery algorithms which, therefore, take longer to execute than lower numbered DRP steps. Furthermore, the recovery steps are classified into groups of similar complexity and, therefore, similar execution time. For example, one thousand "step 4" recovery steps may be temporally equivalent to one hundred "step 8" recovery steps.

As such, at block 404b, an equivalent number of full recoveries over the particular length of time is determined. With reference to the foregoing examples, the number of 2.5-second units of time that a head spends on recovery steps over a 300-hour evaluation period establishes the number of full recoveries for that head. Then, at block 404c, based on the number of full recoveries accrued and the particular length of time evaluated, the FRPH value is determined for the head, which represents how much DRP recovery time (e.g., in units of the time a maximum length full recovery takes) each head spent, per hour, on average, averaged over the last 300 hours, for example. Thus, at block 404, blocks 404a-404c are iterated for each head from each HDD 304a-304n under evaluation. Furthermore, FRPH is computed by examining the recovery log to identify each IO that required any recovery steps, and then adding up an estimate of the total amount of time to perform all of the recovery steps used on behalf of that IO, and the FRPH metric is computed separately for each of the heads in the HDD.

Computation of the FRPH metric values at block 404 may be implemented by analyzing the recovery log over the evaluation period, summing the total number of times that each head spent in each of the hundreds of DRP recovery steps, which would effectively yield a histogram recording the number of invocations of each recovery step/level, per head. For each recovery step, a constant time value that estimates how long that particular recovery step takes to perform can be multiplied by the respective invocations for that recovery step, which would yield the total amount of time spent in any recovery step, per head. The total amount of time spent in all recovery steps can be divided by the evaluation period (e.g., 300 hours), which would yield the average amount of time per hour spent in any recovery step, per head. The average time per hour spent in all recovery steps can be normalized by dividing the time established for a full recovery (e.g., the equivalent of a "full recovery" of 2.5 seconds), which would yield the FRPH value normalized to the evaluation period, where a FRPH value of one would mean that on average, every hour (e.g., over the last 300 hours evaluation period), the head spent the time it takes to perform one full recovery in a recovery operational mode.

At block 406, in response to a particular head FRPH reaching a predetermined FRPH threshold value, an in-situ repair is determined for the HDD in which the particular head operates. For example, and according to an embodiment, an HDD having one or more heads having an FRPH value of one (e.g., the threshold value) or greater over the particular length of time (e.g., the 300 hour evaluation period) is identified as a problematic HDD, i.e., likely to be "silently" failing. Furthermore, the FRPH metric can be made available to clients to query, such as via a RESTful API (representational state transfer application program interface), whereby the client would decide if the FRPH value warrants mitigating action and, if so, would need to initiate such action themselves.

According to an embodiment, if any HDD 304a-304n has one or more heads having an FRPH greater than or equal to one, then the head having the highest FRPH in this problematic HDD is identified, and a "head depop" (head depopulation) is performed on that head, i.e., the head is classified (e.g., to the system controller 312 and/or to the HDD controller 308) as ineligible for use in further IO operations, effectively disabled from further use/operation. Alternatively, according to an embodiment, an otherwise troublesome HDD may be reformatted to its current capacity. For example, in a scenario in which one or more heads have already been "depopped" (depopulated) in a prior repair operation and the decision was made not to depop another head at this time, then the HDD may be reformatted to its current capacity, taking into account the reduced capacity corresponding to the heads that were previously depopped. Furthermore, and according to an embodiment, because it can be ascertained from the Media Error Log how many and which problematic regions of media contributed to the FRPH value, another repair option involves forcibly sparing out the troublesome region(s) of media (e.g., marking the region(s) unavailable for further IOs) rather than undertaking a longer and more complex reformat or depop repair.

Intelligent System-Level Reliability Schemes

Historical storage systems may comprise storage devices that have autonomous, independently designed diagnostic and device reliability schemes, which can lead to reduced efficiency and effectiveness in the overall storage system. By contrast, an expanded holistic view of the operational functionality at and among different storage devices as distributed throughout a storage system may lead to a more efficient and more reliable overall system. The data storage devices, such as DSDs 304a-304n (FIG. 3) that are constituent to a data storage system 200 (FIGS. 2 and 3) can be considered sensitive sensors of factors that may affect the data integrity and reliability associated with each DSD, such as temperature, airflow, vibration, and the like in the context of HDDs, and age, storage cycles, and the like in the context of SSDs. Furthermore, DSDs 304a-304n may be sources of information regarding position error signals (PES) and the factors contributing thereto, DRP recovery operations, and the like, corresponding to a specific head or region of media. Hence, data integrity and recovery information that each DSD may be internally privy to, and combinations thereof, when shared with a system controller such as controller 312 (FIG. 3), can provide an inexpensive but valuable expanded vision of the symptoms of data degradation at the device level, for use as an informed and efficient diagnostic, prognostic, and repair controlling point at the system level. There may also be additional information about the DSDs available at the system level, e.g., available to the system controller 312, that can contribute to and/or be combined to contribute to intelligent, predictive decision-making at the system level. For example, in the context of HDDs, the system controller may be made privy to information such as the storage device form factor, the number of disks (and/or actuators), the disks' RPM (revolution per minute), and other common variations among HDD models, and possibly as well as the location of each storage device within a particular shelf and within the system rack (e.g., rack 202 of FIG. 2), relative proximity to fans, fan speed, relative proximity to heat sources, and other factors external to each device itself. Note that the HDDs 304a-304n, as well as the system controller 312, may be programmed to "learn" over time. Thus, factors that may affect the data reliability associated with each HDD may not be static, i.e., such factors (and repair decisions based thereon) may be dynamic over time.

The closed loop nature of DSD monitoring-diagnosing/ prognosticating-repairing that is described herein is capable of continuously monitoring DSD logs, computing metrics showing behavior of that one DSD, and then comparing the metrics of each DSD to those of its peers to make a "pass/fail" determination. Note that each DSD's event logs are used to compute each DSD's metrics, where each DSD only has awareness of itself. Here, the system can see many DSDs worth of metrics and compare the metrics of one DSD to the metrics of the DSD's peers, where the definition of peer can be variable, e.g., by similar model type, firmware revision, and even by the DSD's use case within the rack. Similarly, computation of each FRPH metric only evaluates the health of the heads on one HDD. However, the diagnostic host can set the threshold for what value of the FRPH metric constitutes a pass or a fail by taking into account how exceptional each drive's FRPH metric score is with respect to the larger ecosystem visible to the diagnostic host. For example and according to an embodiment, the pass/fail threshold (i.e., the FRPH threshold) can be set to a value that equals two or three standard deviations above the mean (or median) FRPH score of the rest of the deployment.

Quality of Service (QoS) Metric to Detect a Poorly Performing Drive

Described herein is a Quality of Service (QoS) metric that is periodically computed and monitored by host software or by the DSDs (aka, drives) themselves. The QoS metric is based on the notion that a drive with perfect quality would fulfill 100% of host IO requests without performing any error recoveries that add latency. That is, each time a drive needs to invoke DRP, any added latency caused by those recovery steps detracts from the quality of service provided to the host. Drives with an excessively poor QoS metric value or trend in the metric value, relative to a fixed specification or relative to peer behavior, can be proactively chosen for examination of the FRPH metric described elsewhere herein. Following evaluation of the FRPH metric, the drive may undergo additional diagnostic and repair steps, and/or proactively be retired from active use. In systems that do not have the ability to obtain the FRPH metric, the drive may be proactively retired from active use based solely on analysis of its QoS metric.

Computing QoS Metric Based on Log Sense Counters

According to embodiments, the QoS metric is computed from parameters reported as SCSI (Small Computer System Interface) "Log Sense" counters, also referred to as SCSI log pages, which can be interrogated or polled from a SCSI target device using a Log Sense command. These Log Sense counters (and Log Sense commands, the supported log page definitions, and page parameter definitions) are defined by long-established industry standards, specifically T10/BSR INCITS SPC (SCSI Primary Commands). In the most recent draft (SPC-4, Revision 37a, published 26 Jun. 2014), which is incorporated by reference in its entirety for all purposes as if fully set forth herein, Table 349 defines the existence of "Write Error Counters" (Page 2), "Read Error Counters" (Page 3), and "Verify Error Counters" (Page 5). Elsewhere in the same draft, Tables 405, 437, and 434 define the existence of common parameters reported within each of these log pages.

According to an embodiment, the QoS metric is computed using parameter codes 0001h (Errors corrected with possible delays), 0004h (Total times correction algorithm processed), and 0005h (Total bytes processed). When the "Log Sense" pages and parameters are combined, the host can compute a total of six distinct QoS metrics: 2 QoS metrics ("with possible delays", "total times processed") for each of three operational domains (read, write, verify). According to an embodiment, each QoS metric is expressed as a floating-point value which indicates the "number of nines" in the average percentage of bytes processed without the drive performing an autonomous error correction.

For example, if Log Sense page 3 "Read Error Counters" reports:

Parameter 0001h: Errors corrected with possible delays: 3;

Parameter 0004h: Total times correction algorithm processed: 176;

Parameter 0005h: Total bytes processed: 1 TB ($1 \times 10^{12}$);

then the percentage of bytes transferred without autonomous error correction is:

(Page 3 Parameter 0005$h$–Page 3 Parameter 0001$h$)/
Page 3 Parameter 0005$h$==(($1 \times 10^{12}$)-3)/($1 \times 10^{12}$)=99.9999999997%.

The corresponding QoS metric would then be computed, according to an embodiment, as:

$QoS$(read)=–log 10(Page 3 Parameter 0001$h$/Page 3 Parameter 0005$h$)=$QoS$(read)=–log 10(3/($1 \times 10^{12}$))=11.52.

Some considerations regarding the foregoing definition of the QoS metric include that if any of the input values to the QoS formula are zero, the metric value cannot be computed. One approach to this concern might be to arbitrarily assign a constant QoS value that means "perfect QoS" which, to do this, a value at the high end of the range of acceptably performing drives with imperfect QoS values for that purpose would be designated. However, it is preferable that all drives (or at least almost all of them) have a computable QoS metric, because that increases the validity of statistical methods such as median, mean, and standard deviation to compare each individual drive QoS metric against the entire population of peer drives, and not just against a subset of "imperfect" drives for which a QoS metric can be computed. The implication here is that the preference is for as broad-based a count of internal data recoveries as possible. Stated otherwise, it is preferable to utilize a counter that reflects all data recoveries being performed by the drive, not just the data recoveries performed directly in fulfillment of host initiated IOs.

Likewise, when the QoS metric is computed with Parameter 0001h in the numerator, which increments once per error recovery, the QoS metric is measuring a "soft-error rate". This is considered useful by itself, but not all soft errors are of equal concern. The more often that a drive must use a highly involved data recovery procedure, the greater the impact there is on the average host-visible latency. Moreover, frequent use of highly involved data recovery procedures implies an increased likelihood that sometime in the near future the drive will be unable to recover the data at all, resulting in a hard error. Thus, it is preferable to utilize a counter which is incremented by a variable amount which is proportional to the latency effect of each error recovery procedure which was utilized.

To reduce the impact of the foregoing considerations, according to an embodiment, a set of QoS statistics can be computed which incorporate Parameter 0004h (which is seldom zero, even when Parameter 0001h is) instead of Parameter 0001h (which experimentation has shown to be zero in 10% to 15% of drives tested). Furthermore, Parameter 0004h is incremented multiple times during each IO's error recovery procedure, i.e., once for each invocation of a data recovery step.

To use Parameter 0004h to form a QoS(read) statistic, the formula is revised to be:

(Page 3 Parameter 0005$h$–Page 3 Parameter 0001$h$)/
Page 3 Parameter 0005$h$==(($1 \times 10^{12}$)-3)/($1 \times 10^{12}$)=99.9999999997%.

The corresponding QoS metric would then be computed, according to an embodiment, as:

$QoS$(read)=–log 10(Page 3 Parameter 0004$h$/Page 3 Parameter 0005$h$)=$QoS$(read)=–log 10(176/($1 \times 10^{12}$))=9.75.

QoS Monitoring in Subsystem of Storage System

According to an embodiment, an alternative deployment strategy for the QoS metric is to embed the monitoring agent/process in the data storage system enclosure monitoring subsystem, which shifts the responsibility for monitoring the QoS statistics of the drive fleet to the enclosure rather than the external hosts, and where the drive model specific knowledge of QoS is encapsulated in a single storage vendor-provided subsystem. Hence, the monitoring agent would be present and active regardless of the status of the hosts and the servers they reside on. However, such an implementation would limit the system enclosure to monitoring and comparing the QoS behavior of drives local to itself and, in a large deployment, it would be necessary to upgrade multiple system enclosures to revise the behavior of the QoS monitoring logic.

Embedding the QoS computation and evaluation process into the storage system enclosure is made more complex by the limited operating system (OS) and compute environment available in typical implementations. Particularly, the typical storage system environment has only SAS (Serial Attached SCSI) Expander(s) in the case of a JBOD ("just a bunch of disks" or "just a bunch of drives"), or PCIe (peripheral component interconnect express) switch chip(s) in the case of a JBOF ("just a bunch of flash"). Such limitations have several key impacts for implementation of the QoS monitoring agent, for example, the absence of a standard OS (e.g., Linux) and associated off-the-shelf host communication tools, the absence of a standard file system (e.g., Ext4) which means the data read by the operations to fetch the precursors of QoS need to fit into a dedicated area of RAM/DRAM, and the absence of hardware support for the floating-point arithmetic operations. Further regarding the floating-point issue, typically it is possible to compile and link code that uses float/double types and invokes the log( ) function, but at runtime all of those operations will trap as unimplemented instructions and get emulated by a floating-point library using integer arithmetic (e.g., as opposed to "direct" processing of floating-point arithmetic). This can greatly increase the execution time associated with computing and comparing QoS metric values and can greatly increase the firmware image size if the floating-point emulation library isn't already being used by the firmware.

According to an embodiment, an alternative implementation of the QoS metric avoids the need for the emulation of floating-point arithmetic. Instead of computing the average percentage of bytes that are transferred without autonomous error correction (i.e., expressed as a floating-point value based on number-of-nines), an implementation seeking to avoid the use of direct (e.g., internal, or integral) floating-point arithmetic capabilities can instead compute the average number of bytes that are transferred without autonomous error correction (e.g., expressed as an integer value based on powers-of-two).

A general expression of the formula for the QoS metric which uses only integer arithmetic is as follows:

$$QoS = \text{\# bytes processed} / \text{\# errors corrected with possible delays}.$$

For example, if Log Sense page 3 "Read Error Counters" reports:

Parameter 0001h: Errors corrected with possible delays: 3;

Parameter 0004h: Total times correction algorithm processed: 176;

Parameter 0005h: Total bytes processed: 1 TB ($1 \times 10^{12}$); then the average number of bytes transferred without autonomous error correction is computed using integer division (dropping any remainder) as:

$$\text{Page 3 Parameter } 0005h / \text{Page 3 Parameter } 0001h = (1 \times 10^{**}12)/3 = 333{,}333{,}333{,}333.$$

The corresponding QoS metric is then computed by ascertaining the position of the most significant bit (MSB) of the resulting dividend:

333,333,333,333=4D.9C37.0555h;

Highest set bit=38;

QoS=38 (e.g., on average $2^{38}$ bytes were transferred without autonomous error correction).

As with the floating-point implementation, the integer implementation is amenable to the computation of a total of six distinct QoS metrics: two QoS metrics ("with possible delays", "total times processed") for each of three operational domains (read, write, verify). However, it is not feasible to directly compare values based on the floating-point and the integer computational methods. Furthermore, as with the floating-point implementation of QoS, the exact value of the integer implementation of the metric is less relevant than the comparison of the metric relative to peer drives, and the trend in the value observed over time periods such as the previous day, week, month, etc. Still further, as with the floating-point implementation of QoS, a provision should be considered to compute an arbitrary value in the case that the drive is exhibiting "perfect" QoS, and the metric is most normative when the drive being considered has similar load characteristics to the pool of its peer drives.

Now generally, the QoS metric is applicable to any environment where one can ascertain how frequently the storage device is performing retries that cause host-visible delay in order to fulfill the requested workload. For example, it is contemplated and considered reasonable to expect that SSDs could be configured to provide similar precursors that would enable computation of a QoS metric value (or, if provided on a per-die basis, an FRPH-like value) as described herein.

Regarding the utilization of Log Sense log counters rather than SMART parameters (sometimes called attributes), while the SMART framework itself is generally supported on all storage device types (HDD/SSD) and all storage device protocol types (SAS/SATA (Serial ATA or Serial Advanced Technology Attachment)/NVMe (non-volatile memory express)), the set of SMART parameters which are supported in any particular storage device's implementation are vendor unique and implementation dependent. In the case of some enterprise SAS HDDs, the parameters used to compute QoS are accessible through either the SMART or Log Sense methods and, therefore, implementation and use of SMART parameters to compute QoS values is specifically contemplated. However, the host action of reading SMART parameters likely causes or could cause the drive to gather and return many extraneous parameters that are not relevant to the QoS computation. Hence, according to an embodiment, it is preferable in that it is less intrusive to gather the inputs to the QoS formula via Log Sense (rather than SMART), because the Log Sense operation is returning a more minimal set of parameters. Similarly, while the Log Sense implementation is currently directly applicable to SAS (SCSI) drives, it is contemplated and considered reasonable to expect that a SATA and/or a NVMe storage device, and other types of future storage devices not yet known, could be configured to support similar capabilities necessary to compute a QoS metric as described herein.

Incremental QoS Metric

By default, the Parameters reported by Log Sense pages are device lifetime-based and, therefore, the direct QoS metric is lifetime as well. However, according to an embodiment, an Incremental QoS metric may be computed by applying the formula to the difference between pairs of Log Sense parameter values captured at different times. This can be performed on an arbitrary time interval although, generally, intervals in the range of one day to one week are considered likely aligned with the probable rate at which frequently utilized drives begin to show degraded or worsening QoS behavior. For example, if samples of Log Sense Parameters 0001h and 0005h (from any of the 3 domains: read, write, verify) are captured at different times, the host can compute an Incremental QoS metric using the following formula. Note that a similar formula for use with Log Sense Parameters 0004h and 0005h is equally valid.

$$\text{Incremental } QoS = -\log 10((\text{Parameter } 0001h(N) - \text{Parameter } 0001(N-1))/(\text{Parameter } 0005h(N) - \text{Parameter } 0005h(N-1)))$$

Determining QoS Metric Pass/Fail Thresholds

According to an embodiment, the determination of a pass/fail threshold for the QoS metric is preferably performed on a device population-relative basis, rather than on an absolute basis. Note that errors that require DRP correction in a relatively healthy drive tend to occur in an infrequent clustered pattern, rather than at a constant rate. Use of the QoS metric is considered especially effective in, but not limited to, an environment such as RAID (Redundant Array of Independent Disks, or Drives) or Erasure Coding where the various affiliated drives are all roughly of the same age (as measured by Power On Hours) and are subjected to comparable workloads. That is, it is preferable not to compare the QoS scores of drives that are of different ages, because a single DRP recovery on a relatively unused (or "young") drive with a low number of bytes processed will alter the QoS metric score more than it would on a relatively more used (or "old") drive. Further, it is preferable not to compare QoS scores among drives which are running dramatically different workloads, because errors requiring DRP recovery are only encountered in cases where the drive accesses an error-prone head or region of the media. Still further, any attempt to establish an absolute threshold for the QoS metric would need to consider the thermal and vibrational characteristics of the drive enclosure.

Drive Monitoring of QoS Metric

Data storage devices typically maintain the statistics necessary to compute the QoS metric, and they periodically record the values of these lifetime statistics. If hosts are able to fetch a time series of snapshots of the lifetime statistics, then a series of both lifetime and incremental QoS metrics could be computed for various time ranges. According to an embodiment, a drive may also be configured to provide a variant of the Log Sense page 2, page 3, and page 5 counters which provides a list of Parameter value sets, with each set showing counters that apply to each of the drive heads, in the case of an HDD. This would permit the host to compute a head-specific QoS metric and would allow the host to compute the FRPH metrics for each head without consulting the E6 logs.

Method of Identifying a Poorly Performing Data Storage Device

Figure 5:
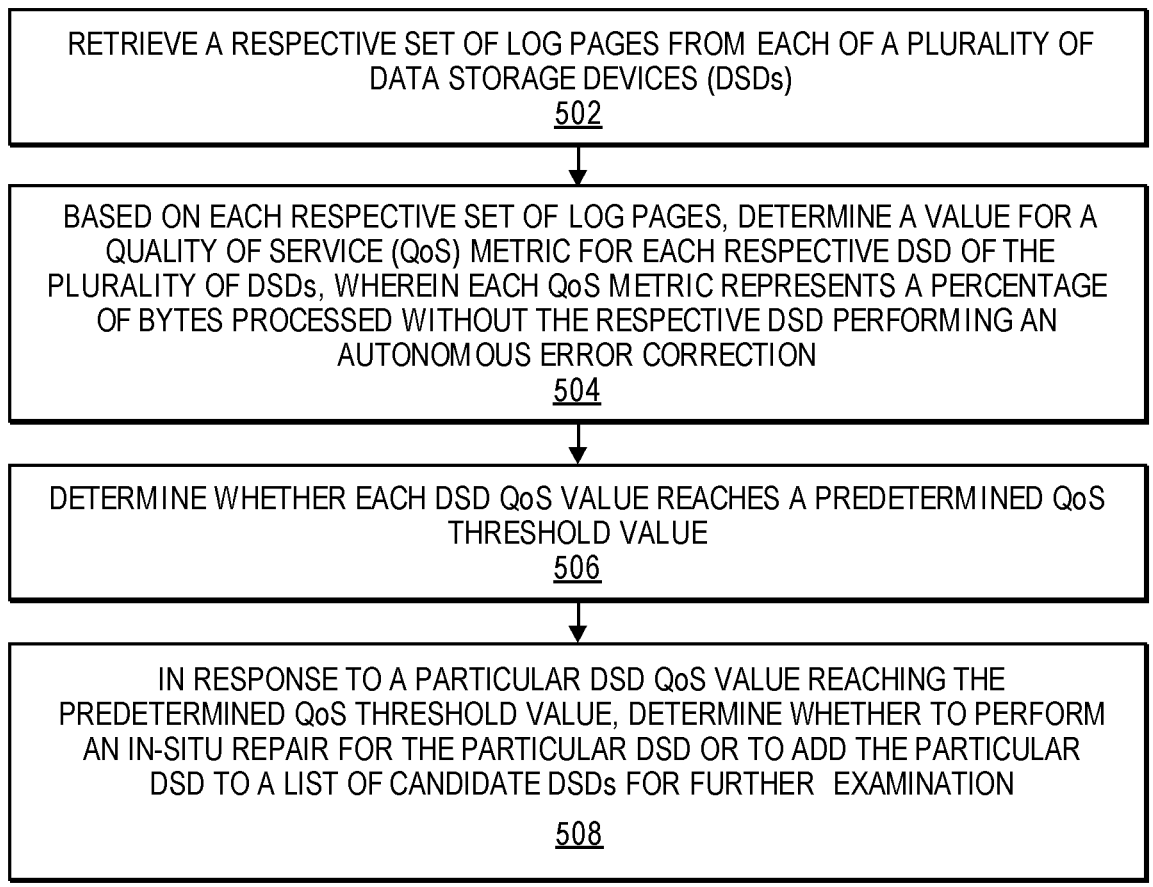
FIG. 5 is a flow diagram illustrating a method of identifying a poorly performing data storage device, according to an embodiment.

FIG. 5 is a flow diagram illustrating a method of identifying a poorly performing data storage device, according to an embodiment. The process or procedure of FIG. 5 may be implemented for execution as one or more sequences of instructions stored in one or more memory units and which, when executed by one or more processors, cause performance of the process. For example, the sequences of instructions (e.g., reliability engine 314 embodied in firmware of system controller 312 of FIG. 3, or embodied in firmware of a hard disk controller and/or SOC of HDD 100 of FIG. 1A, or embodied in firmware of controller 162 of SSD 152 of FIG. 1B) stored in one or more memory units (e.g., ROM inherent to controller firmware) and which, when executed by one or more processors (e.g., processor 315 of system controller 312 of FIG. 3, or a processor constituent to or integrated within a hard disk controller and/or SOC of HDD 100 of FIG. 1A, or a processor constituent to or integrated within a controller 162 of SSD 152 of FIG. 1B), may cause performance of the process illustrated in FIG. 5.

At block 502, a respective set of SCSI (Small Computer System Interface) log pages are retrieved from each of a plurality of data storage devices (DSDs). For example, SCSI Log Sense counters 319 (FIG. 3) are retrieved by system controller 312 (FIG. 3) of data storage system 200 (FIGS. 2, 3) from or in conjunction with the QoS module 318 (FIG. 3) of one or more of the plurality of DSDs 304a-304n (FIG. 3). As described, SCSI "Log Sense" counters (or SCSI log pages) can be interrogated or polled from a SCSI target device (e.g., DSDs 304a-304n) using a Log Sense command, where these Log Sense counters are defined by industry standards, such as T10/BSR INCITS SPC (SCSI Primary Commands).

At block 504, based on each respective set of SCSI log pages, a value for a Quality of Service (QoS) metric is determined or computed for each respective DSD of the plurality of DSDs, wherein each QoS metric represents a percentage of bytes processed without the respective DSD performing an autonomous error correction. Thus, the QoS metric is not directly reported by Log Sense (or SMART) parameters, but is derived from parameters reported by such subsystems. For example and according to an embodiment, a QoS value is computed based on the foregoing QoS formulas using Log Sense parameters as described elsewhere herein. According to an embodiment, the QoS metric values are computed based on the following precursor counters: (a) Parameter 0001h: errors corrected with possible delays or (b) Parameter 0004h: total times correction algorithm processed, and (c) Parameter 0005h: total bytes processed. Further, according to a related embodiment, the QoS metric values are computed based on a domain from the read, write, and verify domains of operation. Still further, according to an embodiment, the QoS metric values are computed based on a predetermined time period that is less than the device lifetime, such as a period in the range of one day to one week, for a non-limiting example.

At block 506, it is determined whether the QoS value for each DSD reaches (e.g., meets, or exceeds) a predetermined QoS threshold. For example, each QoS value may be compared to a certain percentile or standard deviation corresponding to the median, mean, or some other statistical measure, for the DSD population (e.g., DSDs 304a-304n of FIG. 3) of a data storage system (e.g., data storage system 200 of FIG. 3). Thus, a given drive QoS metric is not necessarily evaluated against a static pass/fail threshold, rather it is evaluated against the QoS metrics (and observed trends in QoS metrics) of affiliated peer drives, according to an embodiment.

At block 508 and according to an embodiment, in response to a particular DSD QoS value reaching the predetermined QoS threshold value (e.g., at block 506), it is determined whether to perform an in-situ repair for the particular DSD or to add the particular DSD to a list of candidate DSDs for further examination, investigation or prognostication. For example, various in-situ repair operations described elsewhere herein may be executed on or in association with the particular DSD in response to the DSD QoS value reaching the threshold. Or, according to an embodiment, the particular DSD may be placed on a candidate list for further FRPH (Full Recoveries Per Hour) examination or computation, as described elsewhere herein, in response to the DSD QoS value reaching the threshold. In the latter case, in response to a particular HDD head FRPH reaching a predetermined FRPH threshold value, then an in-situ repair may be determined for the particular HDD in which the particular head operates.

Now generally, the QoS metric is measuring the host visible effect of high soft error rates, i.e., the drive has encountered many errors that have been autonomously corrected by the device, in contrast with approaches that may utilize hard errors that may indicate a pending drive failure. Embodiments described herein can utilize the QoS metric for identifying/removing drives whose slowness relative to peers is already causing immediate performance problems (e.g., latency) for the data set located thereon and affiliated peer drives, rather than strictly in predicting future data loss and/or drive failures. With the QoS metric, a poorly performing drive may be identified based on a trend analysis of that drive, but also based on the value of the QoS metric relative to affiliated peers.

Host Monitoring of QoS Metric

In general, HDDs that exhibit low peer-relative values of QoS, and which also exhibit a large decline in lifetime QoS over the most recent monitoring period (e.g., one week), are the most likely drives to contain a head which exhibits marginal or unacceptable values of FRPH. According to an embodiment, an example process illustrating a procedure for providing effective monitoring of QoS among a pool of affiliated drives in a system level deployment is as follows.

Figure 6:
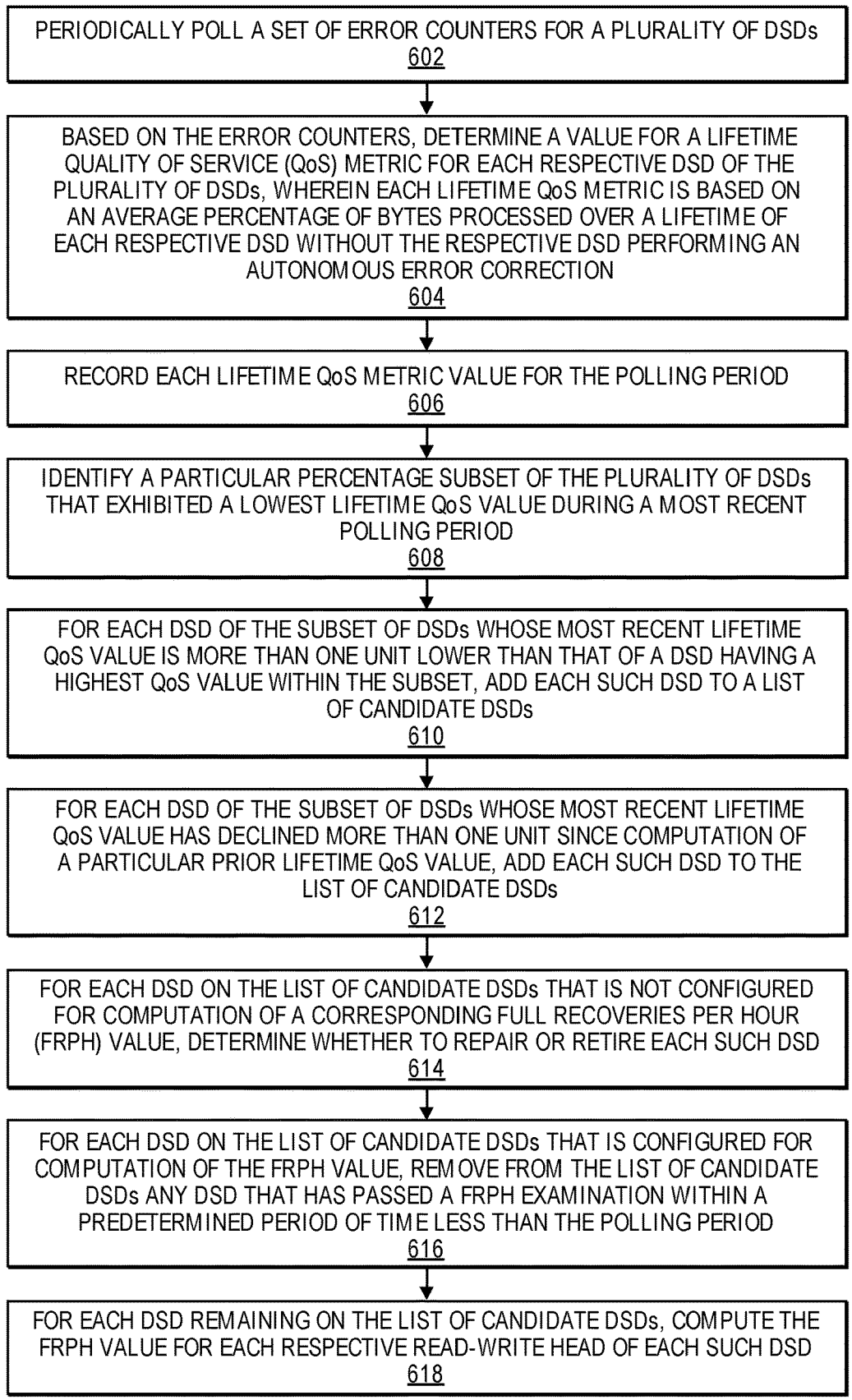
FIG. 6 is a flow diagram illustrating a method of identifying poorly performing data storage devices, according to an embodiment.

FIG. 6 is a flow diagram illustrating a method of identifying poorly performing data storage devices, according to an embodiment. The process or procedure of FIG. 6 may be implemented for execution as one or more sequences of instructions stored in one or more memory units and which, when executed by one or more processors, cause performance of the process. For example, the sequences of instructions (e.g., reliability engine 314 embodied in firmware of system controller 312 of FIG. 3) stored in one or more memory units (e.g., ROM inherent to controller firmware) and which, when executed by one or more processors (e.g., processor 315 of system controller 312 of FIG. 3), may cause performance of the process illustrated in FIG. 6. According to embodiments, the process of FIG. 6 may be applied to a plurality of DSDs constituent to a unitary (single) data storage system, or the process of FIG. 6 may be applied to a plurality of DSDs constituent to a plurality of data storage systems (e.g., a multi-system deployment).

At block 602, a set of error counters for a plurality of affiliated data storage devices (DSDs) constituent to a data storage system are periodically polled. For example, once a day, poll Log Sense Page 3 from all DSDs that are in an "Online" state, which will yield unique samples of Log Sense page parameter data for each DSD in the storage system deployment. For example, SCSI Log Sense counters 319 (FIG. 3) are polled, captured, interrogated, retrieved by system controller 312 (FIG. 3) of data storage system 200 (FIGS. 2, 3) from or in conjunction with the QoS module 318 (FIG. 3) of one or more of the plurality of DSDs 304a-304n (FIG. 3). As described, SCSI "Log Sense" counters (or SCSI log pages) can be polled from a SCSI target device (e.g., DSDs 304a-304n) using a Log Sense command, where these Log Sense counters are defined by industry standards, such as T10/BSR INCITS SPC (SCSI Primary Commands).

At block 604, based on the error counters, a value for a lifetime Quality of Service (QoS) metric is determined for each respective DSD of the plurality of DSDs, wherein each lifetime QoS(read) metric is based on an average percentage of bytes processed over a lifetime of each respective DSD without the respective DSD performing an autonomous error correction. For example and according to an embodiment, a lifetime QoS value is computed based on the foregoing QoS formulas using Log Sense parameters as described elsewhere herein.

At block 606, each lifetime QoS metric value is recorded for the polling period. For example, each lifetime QoS metric value (computed at block 604) may be recorded in a database (e.g., a data object storage construct associated with, accessible to, and/or under the management of reliability engine 314, and/or the QoS module 318, of FIG. 3, and which is constructed in a manner known to skilled artisans), along with the time/date of the polling, and the drive serial number.

Continuing further with an embodiment of the process, at block 608, a particular percentage/percentile subset of the plurality of DSDs that exhibited their lowest lifetime QoS value during the most recent polling period is identified. For example, once on each day that both "current" and "week old" samples of QoS are available, the database is queried to identify the "worst subset" (perhaps 1%, for a non-limiting example) of drives that exhibited the lowest lifetime QoS (read) metric during the most recent polling cycle.

At block 610, for each DSD of the subset of DSDs whose most recent lifetime QoS value is more than one unit lower than that of the DSD having the highest QoS value within the subset, each such DSD is added to the list of candidate DSDs. For example, for each drive whose most recent lifetime QoS(read) score is more than one unit lower than that of the highest scoring drive within the "worst subset" group, add that drive to the list of candidate drives for FRPH examination.

Additionally, at block 612, for each DSD of the subset of DSDs whose most recent lifetime QoS value has declined more than one unit since computation of a particular prior lifetime QoS value, each such DSD is added to the list of candidate DSDs. For example, within the "worst subset" group, for each drive whose lifetime QoS(read) score has declined by more than one unit since the metric value sample captured e.g., one week prior, add that drive to the list of candidate drives for FRPH examination.

At block 614, for each DSD from the list of candidate DSDs that is not configured for computation of a corresponding FRPH value, it is determined whether to repair or to retire each such DSD. For example, in a system that lacks the ability to retrieve the FRPH metric (e.g., a group of SSDs), the host can repair or retire that drive provided that doing so will not unduly compromise system data integrity or safety.

Continuing further with an embodiment of the process, at block 616, for each DSD from the list of candidate DSDs that is configured for computation of a corresponding FRPH value, any DSD that has passed an FRPH examination within a predetermined period of time less than the polling period is removed from the list of candidate DSDs. For example, the list of candidates for FRPH examination is examined, and any drive from the list is removed if it has passed FRPH examination e.g., within the last day.

At block 618, for each DSD remaining on the list of candidate DSDs, the FRPH value is computed for each respective read-write head of each such DSD. For example, for all the drives remaining on the list for FRPH examination, fetch an E6 log and compute the FRPH metric for each head, according to the procedure described in more detail elsewhere herein. According to an embodiment, if the FRPH score for the worst head of any drive exceeds 1.0, then repair or retire that drive provided that doing so will not unduly compromise system data integrity or safety.

Now generally, what is described herein in the context of the QoS metric provides a non-intrusive methodology to identify drives which are exhibiting a higher average latency than their peers, while other methods known within the storage industry are focused on mitigation of excessive tail latency, measurements that aggregate irrelevant sources of latency, or reliance on the drive itself to signal that it is no longer healthy (e.g., SMART). The QoS metric provides an alternative solution to having the storage system periodically fetch E6 logs from all drives to check if any of them exhibit an unacceptable FRPH metric, which would likely consume non-trivial resources including disk IOs, bus bandwidth, CPU cores/cycles and memory bandwidth, all of which are expensive and considered precious in data storage systems. Furthermore, the concept behind the QoS metric is not unique to SCSI or to rotating-media disk drives. Rather, QoS is a simple measurement that reflects how hard any type of storage device is working to maintain the integrity of data being processed during host read, write, or verify operations.

Hard Disk Drive Configuration

As discussed, embodiments may be used in the context of a data storage system in which multiple data storage devices (DSDs) such as HDDs are employed. Thus, in accordance with an embodiment, a plan view illustrating an HDD 100 is shown in FIG. 1A to illustrate exemplary operating components.

Figure 1A:
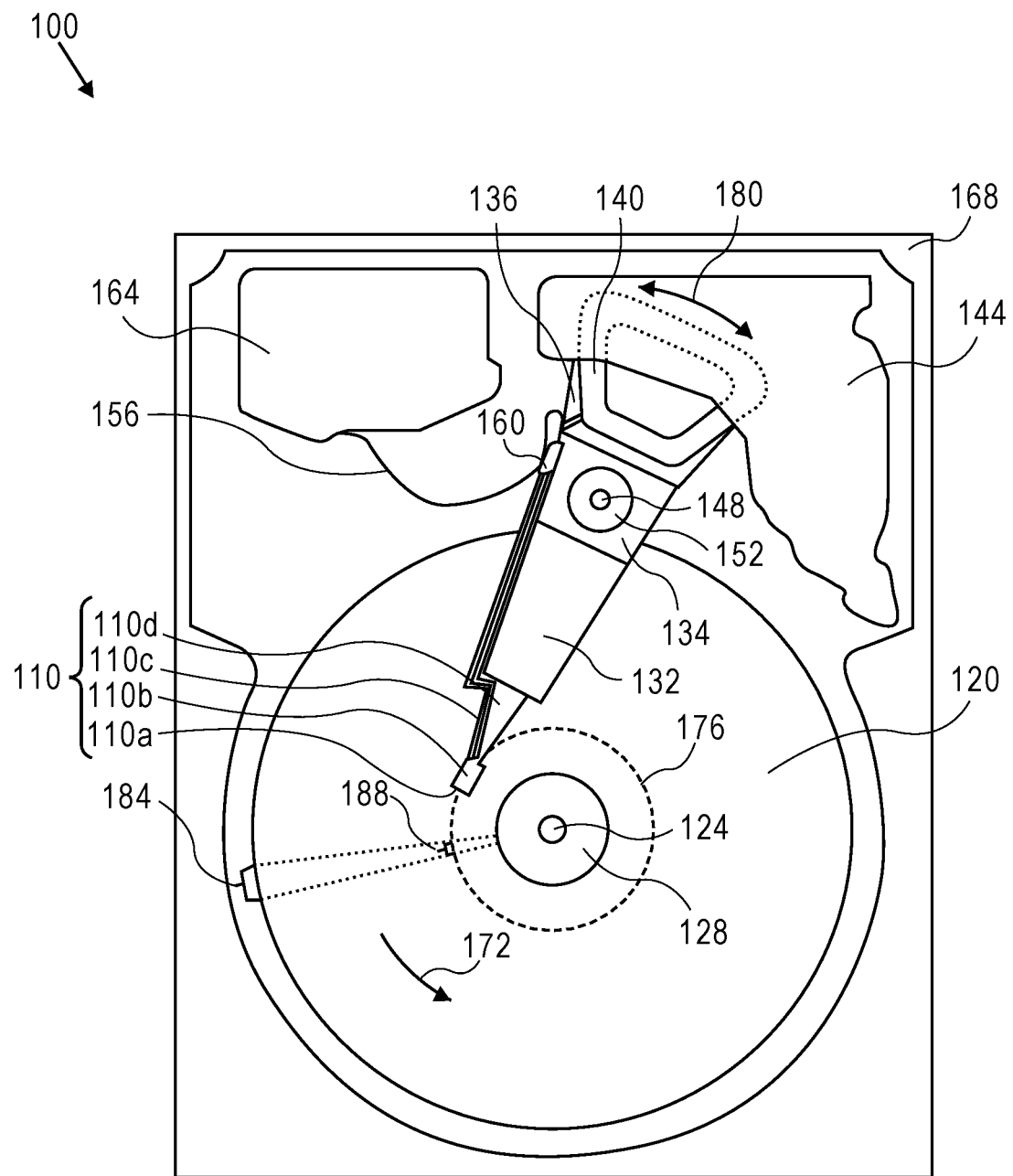
FIG. 1A is a plan view illustrating a hard disk drive (HDD), according to an embodiment.

FIG. 1A illustrates the functional arrangement of components of the HDD 100 including a slider 110*b* that includes a magnetic read-write head 110*a*. Collectively, slider 110*b* and head 110*a* may be referred to as a head slider. The HDD 100 includes at least one head gimbal assembly (HGA) 110 including the head slider, a lead suspension 110*c* attached to the head slider typically via a flexure, and a load beam 110*d* attached to the lead suspension 110*c*. The HDD 100 also includes at least one recording medium 120 rotatably mounted on a spindle 124 and a drive motor (not visible) attached to the spindle 124 for rotating the medium 120. The read-write head 110*a*, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110*a*, are transmitted by a flexible cable assembly (FCA) 156 (or "flex cable"). Interconnection between the flex cable 156 and the head 110*a* may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110*a* of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110*b* rides so that the slider 110*b* flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110*b* rides.

The electrical signal provided to the voice coil 140 of the VCM enables the head 110*a* of the HGA 110 to access a track 176 on which information is recorded. Thus, the armature 136 of the VCM swings through an arc 180, which enables the head 110*a* of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110*a* of the HGA 110 reads the servo-burst-signal pattern, which provides a position-error-signal (PES) to the servo electronics, which controls the electrical signal provided to the voice coil 140 of the VCM, thereby enabling the head 110*a* to follow the track 176. Upon finding the track 176 and identifying a particular sectored track portion 188, the head 110*a* either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Solid State Drive Configuration

Figure 1B:
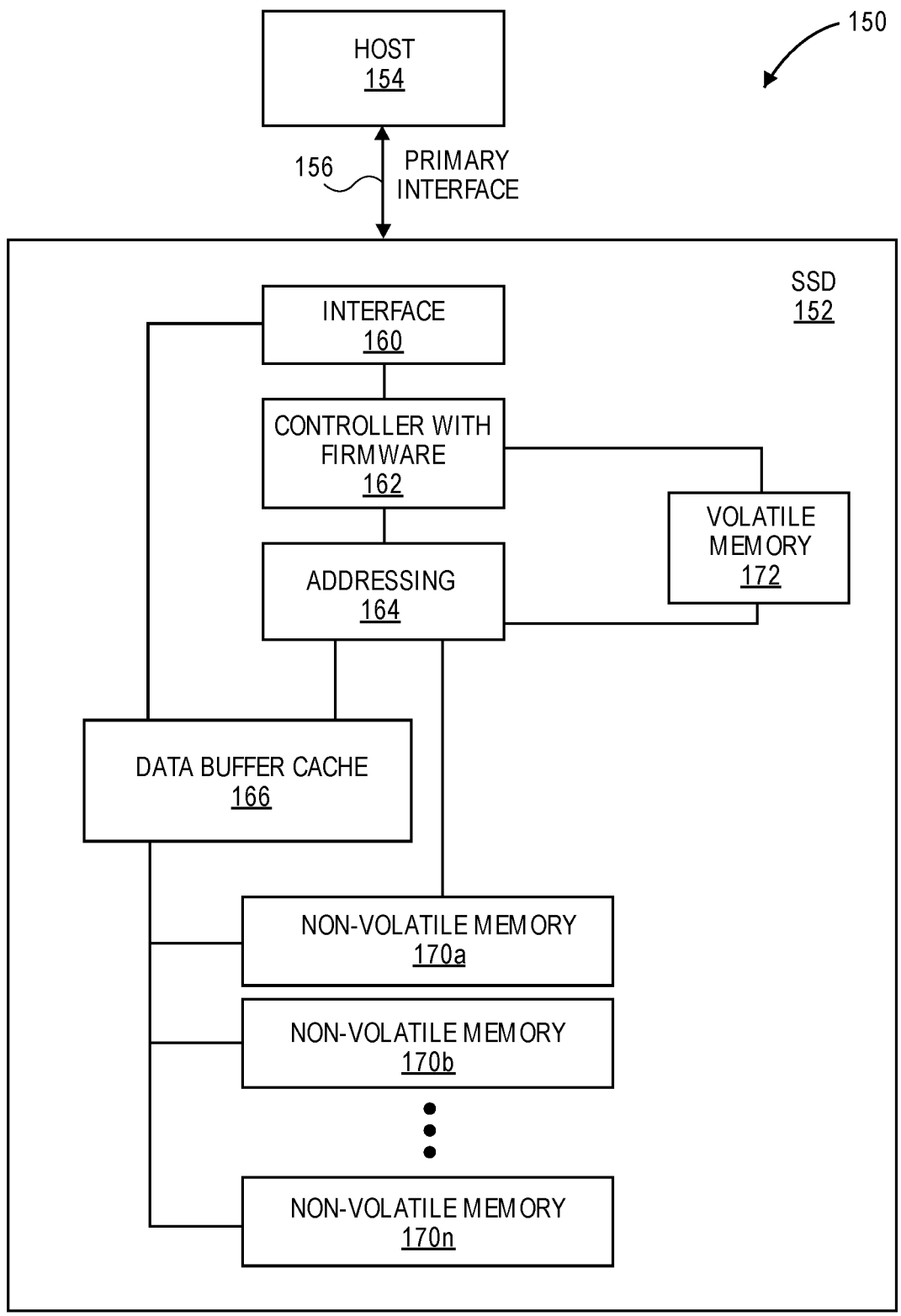
FIG. 1B is a block diagram illustrating a solid-state drive (SSD), according to an embodiment.

As discussed, embodiments may be used in the context of a data storage system in which multiple data storage devices (DSDs) such as SSDs are employed. Thus, FIG. 1B is a block diagram illustrating an example operating context with which embodiments of the invention may be implemented. FIG. 1B illustrates a generic SSD architecture 150, with an SSD 152 communicatively coupled with a host 154 through a primary communication interface 156. Embodiments are not limited to a configuration as depicted in FIG. 1B, rather, embodiments may be implemented with SSD configurations other than that illustrated in FIG. 1B. For example, embodiments may be implemented to operate in other environments that rely on non-volatile memory storage components for writing and reading of data.

Host 154 broadly represents any type of computing hardware, software, or firmware (or any combination of the foregoing) that makes, among others, data I/O requests or calls to one or more memory device. For example, host 154 may be an operating system executing on a computer, a tablet, a mobile phone, or generally any type of computing device that contains or interacts with memory, such as host 350 (FIG. 3). The primary interface 156 coupling host 154 to SSD 152 may be, for example, a storage system's internal bus or a communication cable or a wireless communication link, or the like.

The example SSD 152 illustrated in FIG. 1B includes an interface 160, a controller 162 (e.g., a controller having firmware logic therein), an addressing 164 function block, data buffer cache 166, and one or more non-volatile memory components 170a, 170b-170n.

Interface 160 is a point of interaction between components, namely SSD 152 and host 154 in this context, and is applicable at the level of both hardware and software. This allows a component to communicate with other components via an input/output (IO) system and an associated protocol. A hardware interface is typically described by the mechanical, electrical and logical signals at the interface and the protocol for sequencing them. Some non-limiting examples of common and standard interfaces include SCSI (Small Computer System Interface), SAS (Serial Attached SCSI), and SATA (Serial ATA).

An SSD 152 includes a controller 162, which incorporates the electronics that bridge the non-volatile memory components (e.g., NAND flash) to the host, such as non-volatile memory 170a, 170b, 170n to host 154. The controller is typically an embedded processor that executes firmware-level code and is an important factor in SSD performance.

Controller 162 interfaces with non-volatile memory 170a, 170b, 170n via an addressing 164 function block. The addressing 164 function operates, for example, to manage mappings between logical block addresses (LBAs) from the host 154 to a corresponding physical block address on the SSD 152, namely, on the non-volatile memory 170a, 170b, 170n of SSD 152. Because the non-volatile memory page and the host sectors are different sizes, an SSD has to build and maintain a data structure that enables it to translate between the host writing data to or reading data from a sector, and the physical non-volatile memory page on which that data is actually placed. This table structure or "mapping" may be built and maintained for a session in the SSD's volatile memory 172, such as DRAM or some other local volatile memory component accessible to controller 162 and addressing 164. Alternatively, the table structure may be maintained more persistently across sessions in the SSD's non-volatile memory such as non-volatile memory 170a, 170b-170n.

Addressing 164 interacts with data buffer cache 166, in addition to non-volatile memory 170a, 170b-170n. Data buffer cache 166 of an SSD 152 typically uses DRAM as a cache, similar to the cache in hard disk drives. Data buffer cache 166 serves as a buffer or staging area for the transmission of data to and from the non-volatile memory components, as well as serves as a cache for speeding up future requests for the cached data. Data buffer cache 166 is typically implemented with volatile memory so the data stored therein is not permanently stored in the cache, i.e., the data is not persistent.

Finally, SSD 152 includes one or more non-volatile memory 170a, 170b-170n components. For a non-limiting example, the non-volatile memory components 170a, 170b-170n may be implemented as flash memory (e.g., NAND or NOR flash), or other types of solid-state memory available now or in the future. The non-volatile memory 170a, 170b-170n components are the actual memory electronic components on which data is persistently stored. The non-volatile memory 170a, 170b-170n components of SSD 152 can be considered the analogue to the hard disks in hard-disk drive (HDD) storage devices.

Furthermore, references herein to a data storage device may encompass a multi-medium storage device (or "multi-medium device", which may at times be referred to as a "multi-tier device" or "hybrid drive"). A multi-medium storage device refers generally to a storage device having functionality of both a traditional HDD (see, e.g., HDD 100) combined with an SSD (see, e.g., SSD 150) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A multi-medium storage device may be architected and configured to operate and to utilize the solid-state portion in a number of ways, such as, for non-limiting examples, by using the solid-state memory as cache memory, for storing frequently-accessed data, for storing I/O intensive data, for storing metadata corresponding to payload data (e.g., for assisting with decoding the payload data), and the like. Further, a multi-medium storage device may be architected and configured essentially as two storage devices in a single enclosure, i.e., a traditional HDD and an SSD, with either one or multiple interfaces for host connection.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicant(s) to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A method for identifying a poorly performing data storage device (DSD), the method comprising:
   retrieving a respective set of error log pages from each of a plurality of data storage devices (DSDs);
   based on each respective set of error log pages, determining a value for a Quality of Service (QoS) metric for each respective DSD of the plurality of DSDs, wherein each QoS value represents a percentage of total bytes processed without the respective DSD performing an autonomous error correction;
   determining whether each DSD QoS value reaches a predetermined QoS threshold value; and
   in response to a particular DSD QoS value reaching the predetermined QoS threshold value, determining whether to perform an in-situ repair for the particular DSD or to add the particular DSD to a list of candidate DSDs for further examination.

2. The method of claim 1, wherein:
   retrieving the set of error log pages comprises retrieving a set of SCSI (Small Computer System Interface) Log Sense counters; and
   determining the value for the QoS metric comprises determining based on at least two parameters from a group of parameters consisting of (1) Parameter 0001h: errors corrected with possible delays, (2) Parameter 0004h: total times correction algorithm processed, and (3) Parameter 0005h: total bytes processed.

3. The method of claim 2, wherein determining the value for the QoS metric comprises determining based on one domain from a group of domains consisting of read, write, and verify operational domains.

4. The method of claim 1, wherein retrieving the set of error log pages comprises retrieving a set of SMART (Self-Monitoring, Analysis and Reporting Technology) parameters indicating (i) a number of total errors corrected, (ii) a number of correction algorithm invocations, and (iii) a number of total bytes processed.

5. The method of claim 1, wherein determining the value for the QoS metric comprises determining the value for the QoS metric corresponding to a predetermined period of time less than a lifetime of each respective DSD.

6. The method of claim 1, wherein determining whether a particular DSD QoS value reaches a predetermined QoS threshold value comprises comparing the particular DSD QoS value to a statistical measure of a QoS value corresponding to the plurality of DSDs.

7. The method of claim 6, wherein the plurality of DSDs are affiliated in a RAID (Redundant Array of Independent Disks, or Drives) grouping of DSDs.

8. The method of claim 6, wherein the plurality of DSDs are affiliated in an erasure coding paradigm applied to the plurality of DSDs.

9. The method of claim 1, wherein determining whether to add the particular DSD to the list comprises determining whether to add the particular DSD to a list of candidate DSDs for further Full Recoveries Per Hour (FRPH) examination comprising:
   retrieving a recovery log from the particular DSD which is a particular hard disk drive (HDD); and
   based on the recovery log, determining a value for a FRPH metric for each respective read-write head of the particular HDD, including:
      summing an amount of time the head spends on all recovery steps performed by the head over a particular length of time, including characterizing a full recovery as corresponding to a predetermined length of time the head spends on one or more recovery steps,
      determining an equivalent number of full recoveries over the particular length of time, and
      based on the number of full recoveries and the particular length of time, determining the value for the FRPH metric for the head.

10. The method of claim 9, further comprising:
   in response to a value for a particular head FRPH metric reaching a predetermined FRPH threshold value, determining an in-situ repair for the particular HDD in which the particular head operates.

11. A method for identifying a poorly performing data storage device (DSD) from a plurality of affiliated DSDs constituent to a data storage system, the method comprising:
   periodically polling a set of error counters for the plurality of DSDs;
   based on the error counters, determining a value for a lifetime Quality of Service (QoS) metric for each respective DSD of a plurality of DSDs, wherein each lifetime QoS value is based on an average percentage of total bytes processed over a lifetime of each respective DSD without the respective DSD performing an autonomous error correction; and
   recording each lifetime QoS value for the polling period.

12. The method of claim 11, further comprising:
   identifying a particular percentage subset of the plurality of DSDs that exhibited a lowest lifetime QoS value during a most recent polling period;
   for each DSD of the subset of DSDs whose most recent lifetime QoS value is more than one unit lower than that of a DSD having a highest lifetime QoS value within the subset, adding each such DSD to a list of candidate DSDs;
   for each DSD of the subset of DSDs whose most recent lifetime QoS value has declined by more than one unit since computation of a particular prior lifetime QoS value, adding each such DSD to the list of candidate DSDs; and
   for each DSD on the list of candidate DSDs that is not configured for computation of a corresponding Full Recoveries Per Hour (FRPH) value, determining whether to repair or retire each such DSD.

13. The method of claim 12, further comprising:
for each DSD on the list of candidate DSDs that is configured for computation of the FRPH value, removing from the list of candidate DSDs any DSD that has passed a FRPH examination within a predetermined period of time less than the polling period; and
for each DSD remaining on the list of candidate DSDs, computing the FRPH value for each respective read-write head of each such DSD.

14. The method of claim 11, wherein the plurality of DSDs are constituent to a single data storage system.

15. The method of claim 11, wherein the plurality of DSDs are constituent to a plurality of data storage systems.

16. A data storage system comprising:
a system controller circuitry comprising memory and one or more processors and embodying one or more sequences of instructions which, when executed by the one or more processors, cause performance of:
retrieving a respective set of error log pages from each of a plurality of data storage devices (DSDs);
based on each respective set of error log pages, determining a value for a Quality of Service (QoS) metric for each respective DSD of the plurality of DSDs, wherein each QoS value represents a percentage of total bytes processed without the respective DSD performing an autonomous error correction;
determining whether each DSD QoS value reaches a predetermined QoS threshold value; and
in response to a particular DSD QoS value reaching the predetermined QoS threshold value, determining whether to perform an in-situ repair for the particular DSD or to add the particular DSD to a list of candidate DSDs for further Full Recoveries Per Hour (FRPH) examination.

17. The data storage system of claim 16, wherein:
retrieving the set of error log pages comprises retrieving a set of SCSI (Small Computer System Interface) Log Sense counters; and
determining the value for the QoS metric comprises determining based on at least two parameters from a group of parameters consisting of (1) Parameter 0001h: errors corrected with possible delays, (2) Parameter 0004h: total times correction algorithm processed, and (3) Parameter 0005h: total bytes processed.

18. The data storage system of claim 16, wherein determining whether a particular DSD QoS value reaches a predetermined QoS threshold value comprises comparing the particular DSD QoS to a statistical measure of a QoS value corresponding to the plurality of DSDs.

19. The data storage system of claim 16, wherein the one or more processors are not configured to directly process floating-point arithmetic operations.

20. A data storage system comprising:
a plurality of data storage devices (DSDs);
means for retrieving a respective set of SCSI (Small Computer System Interface) log pages from each of the plurality of data storage devices (DSDs);
means for determining, based on each respective set of SCSI log pages, a value for a Quality of Service (QoS) metric for each respective DSD of the plurality of DSDs, wherein each QoS value represents a percentage of total bytes processed without the respective DSD performing an autonomous error correction;
means for determining whether each DSD QoS value reaches a predetermined QoS threshold value; and
means for determining, in response to a particular DSD QoS value reaching the predetermined QoS threshold value, whether to perform an in-situ repair for the particular DSD or to add the particular DSD to a list of candidate DSDs for further Full Recoveries Per Hour (FRPH) examination.

* * * * *

UNITED STATES PATENT AND TRADEMARK OFFICE
CERTIFICATE OF CORRECTION

PATENT NO. : 11,237,893 B2
APPLICATION NO. : 16/688992
DATED : February 1, 2022
INVENTOR(S) : Lester et al.

It is certified that error appears in the above-identified patent and that said Letters Patent is hereby corrected as shown below:

In the Specification

At Column 2, Line 31-Column 3, Line 11, replace the text with the following text:
FIG. 3 is a block diagram illustrating a data storage system architecture, according to an embodiment. Example architecture 300 illustrates a data storage system 200 that comprises multiple hard disk drives (HDDs) 304a (DSD1), 304b (DSD2), and 304n (DSDn), where n represents an arbitrary number of HDDs (and/or SSDs) that may vary from implementation to implementation. Each DSD 304a-304n is communicative with and under the control of a data storage system controller 312, via a communication interface 322 according to a corresponding communication protocol 323. Each DSD 304a-304n includes corresponding non-volatile memory (NVM) 306 (e.g., typically in the form of spinning magnetic disk media in the case of HDDs) controlled by a respective HDD controller 308, which includes a log module 310. Each log module 310 (which may be, for example, constituent to a corresponding system on chip (SoC), such as part of the data channel circuitry or the hard disk controller circuitry, as depicted, in the context of an HDD) is capable of logging actions taken by the HDD controller 308, such as logging of read, write, and seek errors, associated recovery actions, and other near-term and long-term HDD status information. The system controller 312 of data storage system 200 includes memory 313, a processor 315, and a reliability engine 314 and an associated FRPH (Full Recoveries Per Hour) module 316, which collectively represent procedural functionality involving prognosticating of and in-situ repair of the DSDs 304a-304n, as described in more detail elsewhere herein.
Processing, functions, procedures, actions, method steps, and the like, that are described herein as being performed or performable by system controller 312, or by a DSD 304a-304n, may include enactment by execution of one or more sequences of instructions stored in one or more memory units and which, when executed by one or more processors, cause such performance. System controller 312 may be embodied in any form of and/or combination of software, hardware, and firmware. For example, and according to an embodiment, the system controller 312 comprises an application-specific integrated circuit (ASIC) comprising at least one memory unit for storing such instructions (such as firmware, for a non-limiting example) and at least one processor for executing such instructions, enabling prognosticating regarding potentially problematic HDDs (e.g., silent failing drives, which might be struggling internally to complete data transactions but have not yet failed Signed and Sealed this
Twenty-second Day of November, 2022

Katherine Kelly Vidal
*Director of the United States Patent and Trademark Office*

CERTIFICATE OF CORRECTION (continued)
U.S. Pat. No. 11,237,893 B2 publicly) of the plurality of DSDs 304a-304n, and managing, controlling, facilitating in-situ repair actions corresponding to failed and failing HDDs.

At Column 3, Lines 12-26, replace the text with the following text:
The data storage system 200 may be communicatively coupled with a host 350, which may be embodied in a hardware machine on which executable code executes (for non-limiting examples, a computer or hardware server, and the like), or as software instructions executable by one or more processors (for non-limiting examples, a software server such as a database server, application server, media server, and the like). Host 350 generally represents a client of the data storage system 200, and has the capability to make read and write requests (input/output or IO to) the data storage system 200. Note that the system controller 312 may also be referred to as a host because the term is often generally used in reference to any device that makes IO calls to a data storage device or an array of devices, such as DSDs 304a-304n.

At Column 7, Lines 14-42, replace the text with the following text:
At block 402, a respective recovery log is retrieved from each of a plurality of hard disk drives. For example, an E6 log 317 (FIG. 3) is retrieved by system controller 312 (FIG. 3) of data storage system 200 (FIGS. 2, 3) from the log module 310 (FIG. 3) of one or more of the plurality of DSDs 304a-304n (FIG. 3). An E6 log 317 refers to an implementation of a binary file used to snapshot the state of an HDD. An E6 log 317 contains a large number (tens) of sub-sections, including a Media Error Log, and is typically in the size range (order of magnitude) of 10 MB to 100 MB, depending on which modes (groups of sections) are fetched. There is also an incremental E6 log capability, which only fetches state that is new i,.e., since the most recent full or incremental fetch. Incremental E6 logs may be as small as a few MB but could be up to the size of a full E6 log 317. The sections of an E6 log 317 have various themes/purposes, some are global fixed size life of the drive state, and some grow over time as more drive activities accumulate. Some of the sections data elements are retained for the life of the drive, and some wrap, with the HDD autonomously deleting older state to avoid exceeding a size boundary ceiling. According to an embodiment, the Media Error Log portion of the E6 log 317 is used hereafter in this method to compute the following FRPH (Full Recoveries Per Hour) metric, and is referred to herein functionally as a recovery log because this particular portion or section of the E6 log 317 records the data recovery steps (e.g., seek recovery, read recovery, write recovery) performed by each read-write head within a corresponding HDD.

At Column 7, Lines 43-62, replace the text with the following text:
At block 404, based on each respective recovery log, a value for the metric referred to as FRPH is determined for each respective read-write head of each respective HDD of the plurality of HDDs. For example, the FRPH value is computed as described hereafter for each read-write head (e.g., read-write head 110a of FIG. 1) of each of the one or more plurality of DSDs 304a-304n, based on the recovery logs retrieved at block 402. A DRP or recovery step is an action that the HDD dynamically invokes to recover data from a sector or sectors that was not readable following the execution of prior steps. For example, there may be hundreds of possible DRP steps available to a HDD/head, which may be more generally classified in one of a category for read, write, and seek recovery steps, where higher step numbers represent more involved recovery algorithms and therefore take longer to execute than lower numbered DRP steps. According to an embodiment, a full recovery is execution of all possible DRP steps. If a full recovery is not successful the host receives a hard error indicating that the data could not be transferred.

CERTIFICATE OF CORRECTION (continued)
U.S. Pat. No. 11,237,893 B2

At Column 8, Lines 32-50, replace the text with the following text:
As such, at block 404b, an equivalent number of full recoveries over the particular length of time is determined. With reference to the foregoing examples, the number of 2.5-second units of time that a head spends on recovery steps over a 300-hour evaluation period establishes the number of full recoveries for that head. Then, at block 404c, based on the number of full recoveries accrued and the particular length of time evaluated, the FRPH value is determined for the head, which represents how much DRP recovery time (e.g., in units of the time a maximum length full recovery takes) each head spent, per hour, on average, averaged over the last 300 hours, for example. Thus, at block 404, blocks 404a-404c are iterated for each head from each DSD 304a-304n under evaluation. Furthermore, FRPH is computed by examining the recovery log to identify each IO that required any recovery steps, and then adding up an estimate of the total amount of time to perform all of the recovery steps used on behalf of that IO, and the FRPH metric is computed separately for each of the heads in the HDD.

At Column 9, Lines 20-43, replace the text with the following text:
According to an embodiment, if any DSD 304a-304n has one or more heads having an FRPH greater than or equal to one, then the head having the highest FRPH in this problematic HDD is identified, and a head depop (head depopulation) is performed on that head, i.e., the head is classified (e.g., to the system controller 312 and/or to the HDD controller 308) as ineligible for use in further IO operations, effectively disabled from further use/operation. Alternatively, according to an embodiment, an otherwise troublesome HDD may be reformatted to its current capacity. For example, in a scenario in which one or more heads have already been depopped (depopulated) in a prior repair operation and the decision was made not to depop another head at this time, then the HDD may be reformatted to its current capacity, taking into account the reduced capacity corresponding to the heads that were previously depopped. Furthermore, and according to an embodiment, because it can be ascertained from the Media Error Log how many and which problematic regions of media contributed to the FRPH value, another repair option involves forcibly sparing out the troublesome region(s) of media (e.g., marking the region(s) unavailable for further IOs) rather than undertaking a longer and more complex reformat or depop repair.

At Column 9, Line 47-Column 10, Line 23, replace the text with the following text:
Historical storage systems may comprise storage devices that have autonomous, independently designed diagnostic and device reliability schemes, which can lead to reduced efficiency and effectiveness in the overall storage system. By contrast, an expanded holistic view of the operational functionality at and among different storage devices as distributed throughout a storage system may lead to a more efficient and more reliable overall system. The data storage devices, such as DSDs 304a-304n (FIG. 3) that are constituent to a data storage system 200 (FIGS. 2 and 3) can be considered sensitive sensors of factors that may affect the data integrity and reliability associated with each DSD, such as temperature, airflow, vibration, and the like in the context of HDDs, and age, storage cycles, and the like in the context of SSDs. Furthermore, DSDs 304a-304n may be sources of information regarding position error signals (PES) and the factors contributing thereto, DRP recovery operations, and the like, corresponding to a specific head or region of media. Hence, data integrity and recovery information that each DSD may be internally privy to, and combinations thereof, when shared with a system controller such as controller 312 (FIG. 3), can provide an inexpensive but valuable expanded vision of the symptoms of data degradation at the device level, for use as an informed and efficient diagnostic, prognostic, and repair controlling point at the system level. There may also be additional information about the DSDs available at the system level, e.g., available to the system controller 312, that can contribute to and/or be combined to contribute to intelligent, predictive decision-making at the system level. For example, in the context of HDDs, the system controller may be made privy to information such as the storage device form factor, the number of disks (and/or actuators), the disks RPM (revolution per minute), and other common variations among HDD models, and possibly as well as the location of each storage device within a particular shelf and within the system rack (e.g., rack 202 of FIG. 2), relative proximity to fans, fan speed, relative proximity to heat sources, and other factors external to each device itself. Note that the DSDs 304a-304n, as well as the system controller 312, may be programmed to learn over time. Thus, factors that may affect the data reliability associated with each HDD may not be static, i.e., such factors (and repair decisions based thereon) may be dynamic over time.